(12) United States Patent
Endrikhovski et al.

(10) Patent No.: US 8,990,391 B2
(45) Date of Patent: *Mar. 24, 2015

(54) COMPUTER SYSTEM EVENTS INTERFACE (71) Applicant: Microsoft Corporation, Redmond, WA (US)

(72) Inventors: Serguei Endrikhovski, Bellevue, WA (US); Paul M. Elrif, Kirkland, WA (US); Jeffrey P. Snover, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/221,740

(22) Filed: Mar. 21, 2014

(65) Prior Publication Data

US 2014/0208335 A1    Jul. 24, 2014

Related U.S. Application Data

(63) Continuation of application No. 11/707,600, filed on Feb. 15, 2007, now Pat. No. 8,683,490.

(51) Int. Cl.
*G06F 9/54* (2006.01)
*G06F 3/048* (2013.01)
(Continued)

(52) U.S. Cl.
CPC .............. *G06F 9/542* (2013.01); *G06F 11/328* (2013.01); *G06F 3/04847* (2013.01); *G06F 11/324* (2013.01); *Y10S 715/963* (2013.01)
USPC ........... 709/224; 719/318; 715/772; 715/963; 705/7.12

(58) Field of Classification Search
CPC .. G06F 11/324; G06F 11/328; G06F 11/3006
USPC .................................. 715/772, 963
See application file for complete search history.

(56) References Cited

U.S. PATENT DOCUMENTS 5,237,684 A    8/1993    Record et al.
5,893,128 A    4/1999    Nauckhoff
(Continued)

FOREIGN PATENT DOCUMENTS

JP    2001051923    2/2001
JP    2002063004    2/2002
(Continued)

OTHER PUBLICATIONS

Slovak, K., "Absolute Beginner's Guide to Microsoft Outlook 2003" (2004), pp. 1-452.*

(Continued)

*Primary Examiner* — Brian W Wathen
(74) *Attorney, Agent, or Firm* — Kate Drakos; Micky Minhas (57) ABSTRACT

An events interface is described, and the events interface includes event sequences that indicate software application events that occur in relation to each other along an adjustable continuum. Each of the event sequences corresponds to a software application that is executable on one or more computer devices, such as a hosted application by the computer devices, where modules of the software are each executable on the computer devices. The events interface also includes past event indicators along the event sequences that each present as a past software application event that occurred on at least one of the computer devices.

20 Claims, 9 Drawing Sheets

(51) Int. Cl.
*G06F 15/173* (2006.01)
*G06F 11/32* (2006.01)
*G06F 3/0484* (2013.01)

(56) References Cited

U.S. PATENT DOCUMENTS

| | | | |
|---|---|---|---|
| 6,006,193 | A | 12/1999 | Gibson et al. |
| 6,076,174 | A | 6/2000 | Freund |
| 6,341,279 | B1 | 1/2002 | Nye |
| 6,526,405 | B1 | 2/2003 | Mannila et al. |
| 6,639,687 | B1 | 10/2003 | Neilsen |
| 6,941,522 | B2 | 9/2005 | Brown |
| 6,985,901 | B1 | 1/2006 | Sachse et al. |
| 7,107,187 | B1 | 9/2006 | Saghier et al. |
| 7,107,496 | B1 | 9/2006 | D'Ippolito et al. |
| 7,146,568 | B2 | 12/2006 | Richardson |
| 7,599,293 | B1 | 10/2009 | Bain et al. |
| 8,683,490 | B2 | 3/2014 | Endrikhovski et al. |
| 2001/0055017 | A1 | 12/2001 | Ording |
| 2003/0084071 | A1 | 5/2003 | Iulo |
| 2005/0027848 | A1 | 2/2005 | Kamenetsky et al. |
| 2005/0081157 | A1 | 4/2005 | Clark et al. |
| 2005/0097471 | A1 | 5/2005 | Faraday et al. |
| 2005/0198576 | A1 | 9/2005 | Childress et al. |
| 2005/0262233 | A1 | 11/2005 | Alon et al. |
| 2005/0289230 | A1 | 12/2005 | Chen et al. |
| 2006/0010382 | A1 | 1/2006 | Ejiri et al. |
| 2006/0048064 | A1 | 3/2006 | Vronay |
| 2006/0112375 | A1 | 5/2006 | Schneider |
| 2006/0242207 | A1 | 10/2006 | Tsyganskiy et al. |
| 2007/0016493 | A1 | 1/2007 | Kelly et al. |
| 2008/0034039 | A1 | 2/2008 | Cisler et al. |
| 2008/0034047 | A1 | 2/2008 | Rosenberg et al. |
| 2008/0201724 | A1 | 8/2008 | Endrikhovski et al. |

FOREIGN PATENT DOCUMENTS

| | | |
|---|---|---|
| JP | 2004005205 | 1/2004 |
| JP | 2004295476 | 10/2004 |
| JP | 2005038332 | 2/2005 |

OTHER PUBLICATIONS

Janssen, C., "Hosted Application Definition—What does Hosted Application mean?", Techopedia [retrieved on Aug. 11, 2014 from http://www.techopedia.com/definition/26633/hosted-application].*
"Event Monitoring Service Version A.04.20 Release Notes", Retrieved from <http://docs.hp.com/en/B7609-90033/B7609-90033.pdf#search=%22event%20monitoring%20user%20interface%20computer%20%2Bpdf%22>,Sep. 2005, pp. 1-21.
"Extended European Search Report", EP Application No. 08730037.2, Oct. 11, 2012, 6 pages.
"Final Office Action", U.S. Appl. No. 11/707,600, Oct. 15, 2010, 13 pages.
"Foreign Notice of Allowance", CN Application No. 200880005016.4, Dec. 5, 2012, 4 pages.
"Foreign Notice of Allowance", JP Application No. 2009-550159, Aug. 5, 2013, 4 pages.
"Foreign Office Action", CN Application No. 200880005016.4, 11/01/11, 11 pages.
"Foreign Office Action", CN Application No. 200880005016.4, Jun. 5, 2012, 9 pages.
"Foreign Office Action", CN Application No. 200880005016.4, Sep. 13, 2010, 10 pages.
"Foreign Office Action", JP Application No. 2009-550159, Dec. 21, 2012, 6 pages.
"International Search Report and Written Opinion", Application No. PCT/US2008/054157, Jul. 28, 2008, 10 pages.
"Non-Final Office Action", U.S. Appl. No. 11/707,600, Jul. 2, 2013, 15 pages.
"Non-Final Office Action", U.S. Appl. No. 11/707,600, Apr. 2, 2010, 13 pages.
"Notice of Allowance", U.S. Appl. No. 11/707,600, Oct. 30, 2013, 8 pages.
"Updating the Windows Operating System", Retrieved from: <https://security.berkeley.edu/MinStds/Updating-Windows.html> on Mar. 23, 2010, University of California, Berkeley, Dec. 12, 2003, 7 pages.
Cook, et al.,' "Balboa: A Framework for Event-Based Process Data Analysis", Retrieved from: <http://www.cs.colorado.edu/department/publications/reports/docs/CU-CS-851-98.pdf> on Feb. 15, 2007, 1998, pp. 1-16.
Hall, et al.,' "SAS Application Performance Monitoring for UNIX", 2002 SAS European User Group Conference, Paris France, Available at <http://www.sas.com/partners/directory/hp/sasapp.pdf#search=%22user%20interface%20performance%20monitor%20manager%20in%20computer%Bpdf%22>,Jun. 13, 2002, 14 pages.
Kleinke, "Microsoft Outlook 2000 Bible", Wiley Publishing, Inc., 1999, pp. 233-285, 387-405.
Newman, et al.,' "MonALISA: A Distributed Monitoring Service Architecture", Proceedings of the Conference for Computing in High Energy and Nuclear Physics, CHEP03, Mar. 2003, pp. 1-8.

\* cited by examiner

COMPUTER SYSTEM EVENTS INTERFACE

RELATED APPLICATION

This application is a continuation of and claims priority to U.S. patent application Ser. No. 11/707,600 filed Feb. 15, 2007 entitled "Computer System Events Interface", the disclosure of which is incorporated by reference herein in its entirety.

BACKGROUND

For computer users, it can seem unmanageable and even frustrating to keep track of the many operational aspects of even a single computer, such as a home computer or laptop. A computer operating system may have various, and often un-related, system tools for computer system management. In addition, there may be separate user interfaces from which to monitor and control the computer system, such as to schedule file backups, defragment a system drive, add or remove a program, restore the system after a failure, and the like. The separate and un-related management tools, programs, utilities, and user interfaces can create an inefficient and cumbersome environment for a user attempting to coordinate and manage a computer system.

SUMMARY

This summary is provided to introduce simplified concepts of a computer system events interface, which is further described below in the Detailed Description. This summary is not intended to identify essential features of the claimed subject matter, nor is it intended for use in determining the scope of the claimed subject matter.

In embodiment(s) of a computer system events interface, the computer system events interface includes past event indicators that each indicate a past computer event. A past event indicator is selectable to initiate an information display pertaining to a corresponding past computer event. The computer system events interface can also include future event indicators that each indicate a future computer event. A future event indicator is selectable to initiate a configuration interface from which corresponding future computer events can be modified. The computer system events interface can also include current event indicators that each indicate a current computer event. A current event indicator is also selectable to initiate a configuration interface from which corresponding current computer events can be modified.

In other embodiment(s) of a computer system events interface, a computer system includes multiple computer devices that are network-connected. A computer device of the computer system includes the computer system events interface that displays computer events corresponding to each of the computer devices. The computer events can include past computer events corresponding to each of the computer devices, current computer events corresponding to each of the computer devices, and/or future computer event corresponding to each of the computer devices.

BRIEF DESCRIPTION OF THE DRAWINGS

Embodiments of a computer system events interface are described with reference to the following drawings. The same numbers are used throughout the drawings to reference like features and components.

DETAILED DESCRIPTION

A computer system events interface provides a user one place from which to view, manage, and control multiple and various computer events corresponding to one or several computer devices. A computer system events interface can include different types of information pertaining to past, current, and/or future computer events for the computer device(s). The information pertaining to computer events can include when a past computer event occurred, when a current computer event occurs, when a future computer event is scheduled to occur, a type of the computer event, and where the computer event occurred. For example, a computer event may utilize or involve internal computer drives and/or devices external to a computer device. Further, a computer event may encompass any combination of user-initiated events and files, system-initiated events and files, and/or software program-initiated events and files.

While features and concepts of the described systems and methods for a computer system events interface can be implemented in any number of different computing systems and environments, embodiments of a computer system events interface are described in the context of the following example systems and environments.

Figure 1:
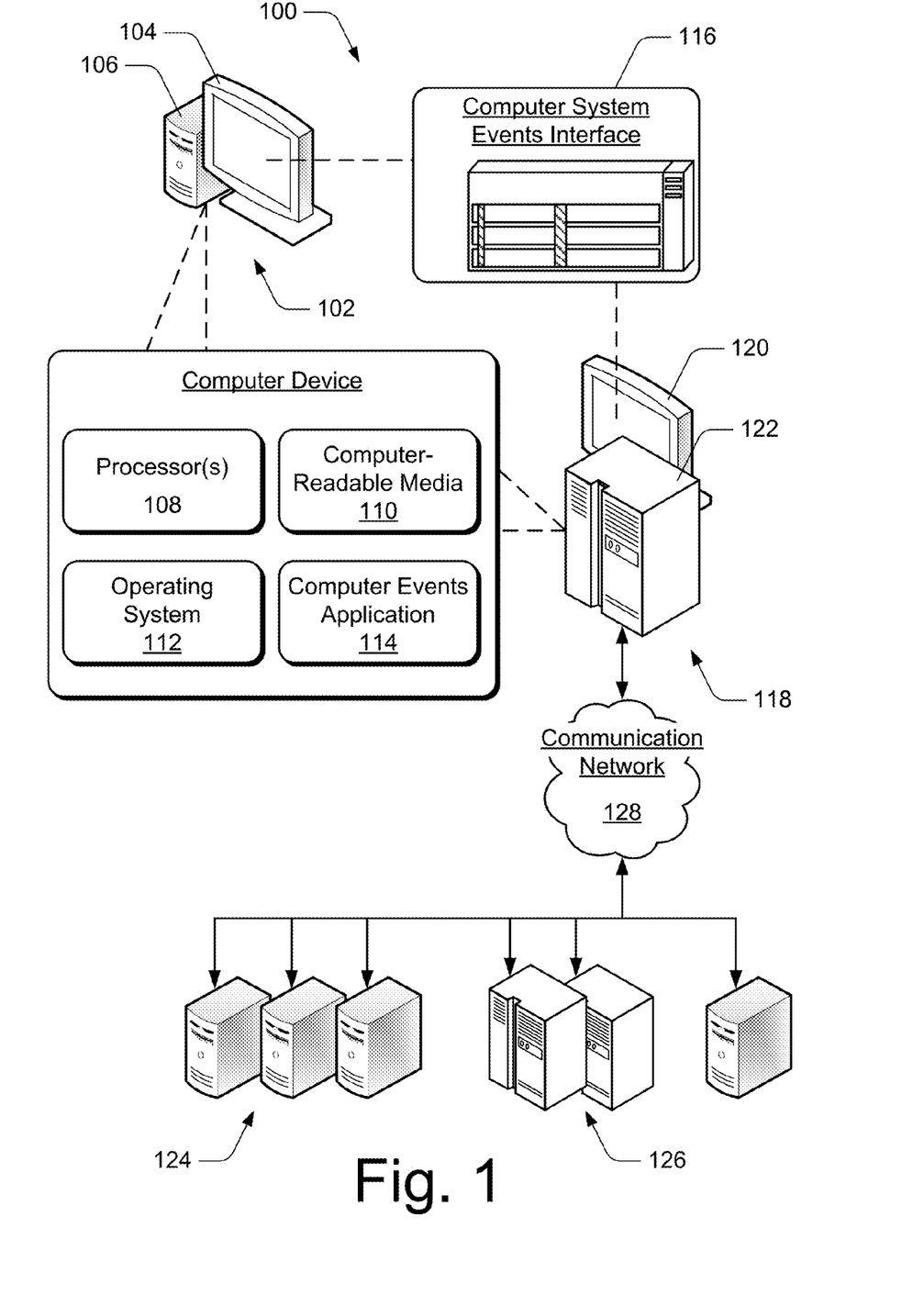
FIG. 1 illustrates example computer systems in which embodiments of a computer system events interface can be implemented.

FIG. 1 illustrates example systems 100 in which various embodiments of a computer system events interface can be implemented. In an embodiment, a computer system 102 includes a display device 104 and a computer device 106. The display device 104 can be any type of display that renders audio, video, and/or image data. In this example, the computer device 106 includes one or more processor(s) 108 (e.g., any of microprocessors, controllers, and the like), and any type of computer-readable media 110 that provides data storage for the computer system 102.

The computer-readable media 110 can maintain software applications, such as an operating system 112 and a computer events application 114. Both the operating system 112 and computer events application 114 can be implemented as computer-executable instructions and executed by the processor(s) 108 to implement embodiments of a computer system events interface. Additionally, computer device 106 can include any number and combination of differing components as further described with reference to the example computer device shown in FIG. 9.

The computer events application 114 can monitor computer events corresponding to the computer device 106, and generate a computer system events interface 116 for display on display device 104. The computer system events interface 116 displays computer events corresponding to the computer device 106. Computer "events" can include, but are not limited to, any type of past, current, future, and/or scheduled computer-related event, task, update, configuration, system change, user modification, and the like. Some examples of past, current, future, and/or scheduled computer events include backing up files, a file copy or delete operation, a file modification, defragmenting a system drive, adding or removing a program, updating a program or system feature, creating a system restore point, a system failure or crash, software installation, a driver installation, a system update, a network update, a software trial expiration, a virus signature update, etc.

In various embodiments, a computer system events interface 116 can display computer events corresponding to any type of computer or computing-based device, such as computer device 106. For example, a computer device can include, but is not limited to, any one or combination of a computer, server, client device, desktop computer, portable computer, portable computing-based device (such as a cellular phone and/or combination PDA), appliance device, gaming console, television set-top client device, and/or as any other type of computer device.

In another embodiment, a computer system 118 includes a display device 120 and a computer device 122 (shown as a server device in this example). The display device 120 can be any type of display that renders audio, video, and/or image data. As described with reference to computer device 106, computer device 122 includes one or more processor(s) 108 (e.g., any of microprocessors, controllers, and the like) and any type of computer-readable media 110 to maintain operating system 112 and the computer events application 114. Additionally, computer device 122 can include any number and combination of differing components as further described with reference to the example computer device shown in FIG. 9.

In computer system 118, the computer events application 114 can monitor computer events corresponding to computer device 122 as well as any number of additional computer devices 124 and/or server devices 126. The computer events application 114 can also generate a computer system events interface 116 for display on display device 120. In computer system 118, the computer system events interface 116 displays computer events corresponding to computer device 122, and displays computer events corresponding to the additional computer devices 124 and/or server devices 126.

In addition to the various components described with reference to computer device 106 and 122, any of the computer devices can include a communication module for network communication. For example, computer device 122 can communicate with the additional computer devices 124 and/or server devices 126 via a communication network 128. The communication network 128 can be any one or combination of a wide area network (e.g., the Internet), a local area network (LAN), an intranet, an IP-based network, a wireless network, or any other type of communication network.

Figure 2:
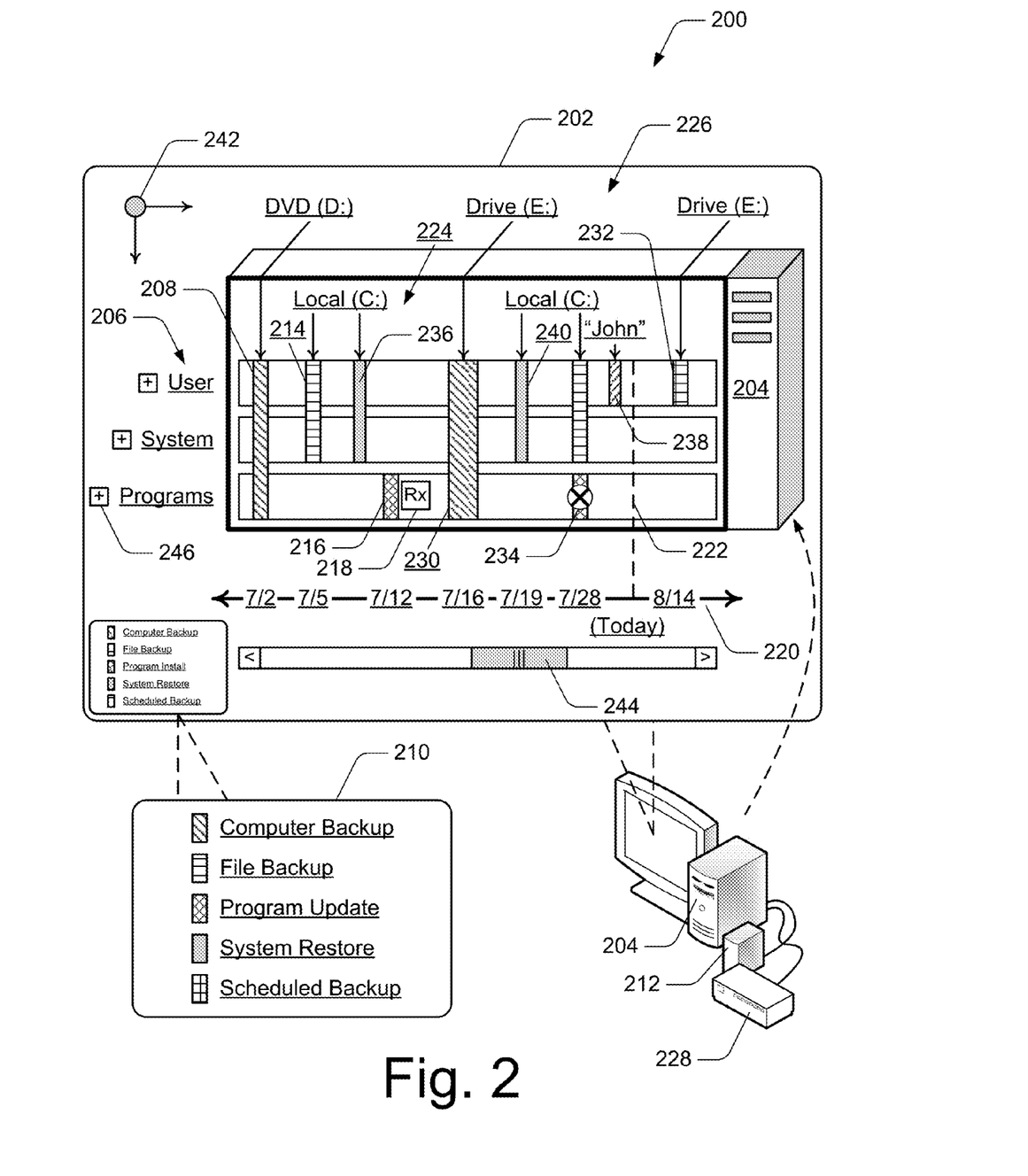
FIG. 2 illustrates embodiment(s) of a computer system events interface for computer events corresponding to a computer device.

FIG. 2 illustrates one or more embodiments 200 of a computer system events interface 202 that can include any number of various display features corresponding to computer events of a computer device 204. The computer system events interface 202 includes categories 206 of computer events and various event indicators, such as event indicator 208. A legend 210 displays examples of the event indicators that are associated with the various computer events corresponding to computer device 204.

The various event indicators are also associated with the categories 206 of computer events. The categories 206 include a "User" category of user-initiated and/or user-file computer events; a "System" category of system-initiated and/or system-file computer events; and a "Programs" category of program-initiated computer events. An example of a computer event associated with a "User" category is a backup of user files. Examples of computer events associated with a "System" category include a backup of the system files, a system failure or crash, creating a system restore point, and the like. Examples of computer events associated with a "Programs" category include adding, removing, or updating programs (also referred to as "software" or "applications"). The "User", "System", and "Programs" categories are merely example classifications and/or groupings of computer events. Any other types of labels, categories, groupings, and/or identifiers may be implemented to associate various computer events on a computer system events interface.

A computer event corresponding to computer device 204 can encompass any one or all of the categories 206. For example, event indicator 208 indicates a computer backup of user files, system files, and the program data to an external DVD drive 212. Event indicator 214 indicates a file backup of user files and system files to a local drive of computer device 204. Event indicator 216 indicates a computer event associated with a program, such as a program update. The computer system events interface 202 also includes a program designation 218 to indicate which computer program has been added, removed, updated, and the like.

The computer system events interface 202 also includes an event sequence 220 to indicate a relationship between past, current, and/or future computer event(s). In this example, the event sequence 220 is ordered by dates, but can be ordered, indexed, or otherwise sequenced by any system, such as by a time sequence, a date and time index, a numeric index, an alphanumeric index, and the like. Past computer events are distinguished from future computer events by a "Today" line 222, or other similar "Now" or "Current" indication that indicates the present date and/or time.

The computer system events interface 202 also includes a computer region 224 that indicates computer events, such as the file backup to a local drive of the computer device 204 indicated by event indicator 214. The computer system events interface 202 also includes an external region 226 (i.e., external to the computer device 204) that indicates computer events, such as a computer backup to an external "Drive (E:)" 228 as indicated by event indicator 230. The external region 226 may also indicate a computer backup to an external volume if storage media is virtualized.

The computer system events interface 202 provides a user one place from which to view, manage, and control multiple and various computer events corresponding to computer device 204. The computer system events interface 202 includes different types of information pertaining to computer events for computer device 204. The information pertaining to computer events can include when a past computer event occurred, when a current computer event occurs, when a future computer event is scheduled to occur, a type of the computer event, and where the computer event occurred (e.g., a user, system, and/or programs category, as well as within the computer device and/or at a device external to the computer device). For example, event indicator 230 indicates a past computer event for a complete computer backup to external drive 228 for each of the user, system, and programs categories on July 16. Further, event indicator 232 indicates a future computer event for a scheduled file backup of only the user files to external "Drive (E:)" 228 on August 14.

An event indicator in the computer system events interface 202 can indicate a result of a corresponding past computer event. For example, event indicator 234 includes an indication that a program update was not successful. Event indicators can also provide a visual indication corresponding to a functional aspect of a computer event. For example, the width of event indicator 230 indicates that the computer backup on July 16 included considerably more computer data than the computer backup on July 2, as indicated by the smaller event indicator 208.

The computer system events interface 202 represents functional properties of computer events (e.g., time, amount, status, etc.) by using visual properties (e.g., position, size, color, etc) of the event indicators. These types of visual representations take advantage of user strengths in pattern recognition and make it easier for a user to comprehend large amounts of information about the computer system. A user can get a quick overview from the computer system events interface 202, as well as determine the differences and interdependencies between various computer events. For example, a computer user or administrator looking at the computer system events interface 202 can quickly determine that a system restore point was created before a program installation. For example, event indicator 236 indicates that a system restore point was created prior to the program update on July 12, as indicated by the event indicator 216. The computer system events interface 202 also indicates whether a computer event such as the system restore point was created by an administrator or user of the computer 204, by the computer system, and/or by an application or program.

The computer system events interface 202 can include event indicators that indicate user-defined events associated with the computer device 204. For example, event indicator 238 has a designation to indicate that a user, "John", defined the event to note it's occurrence in relation to the other computer events in the event sequence 220. For example, a user of the computer 204 may create an event indicator when another person uses the computer, or for some other reason to note when the computer system may be changed intentionally or unintentionally. The user can diagnose from the event sequence 220 that a problem or change to the computer may have occurred as indicated by the user-defined event indicator 238. The user can then go back to a system restore point as indicated by event indicator 240. In an embodiment, event indicator 238 can be associated with a calendar program on the computer device 204 such that a user of the computer 204 can define the event in the calendar.

The computer system events interface 202 can include any number of various selectable controls to initiate a display change of the computer system events interface. For example, a selectable control 242 can pivot the view of the categories 206 and the computer drives in regions 224, 226. Further, a slider control 244 can be selected to "slide" the event sequence 220 for a view of other event indicators corresponding to past computer events or future computer events. The display range or span of the event sequence 220 may also be adjusted to show any number of months, various selectable points in the sequence, filtered event indicators, and the like.

The computer system events interface 202 can include any number of various selectable controls to filter the event indicators and display particular types of computer events. For example, the categories 206 of "User", "System", and "Programs" can be filtered with selectable controls such as 246 to add, select, and/or filter the computer events. Further, the computer system events interface 202 can be filtered to independently display any one or more event indicators of computer events, such as just the computer file backups, program updates, system restore points, and the like. The various selectable controls on the computer system events interface 202 can be implemented as any combination of drop-down menus, slide controls, pivot controls, selectable mouse "right-click" features, scroll bars, zoom in/out, event filtering, and the like.

Figure 3:
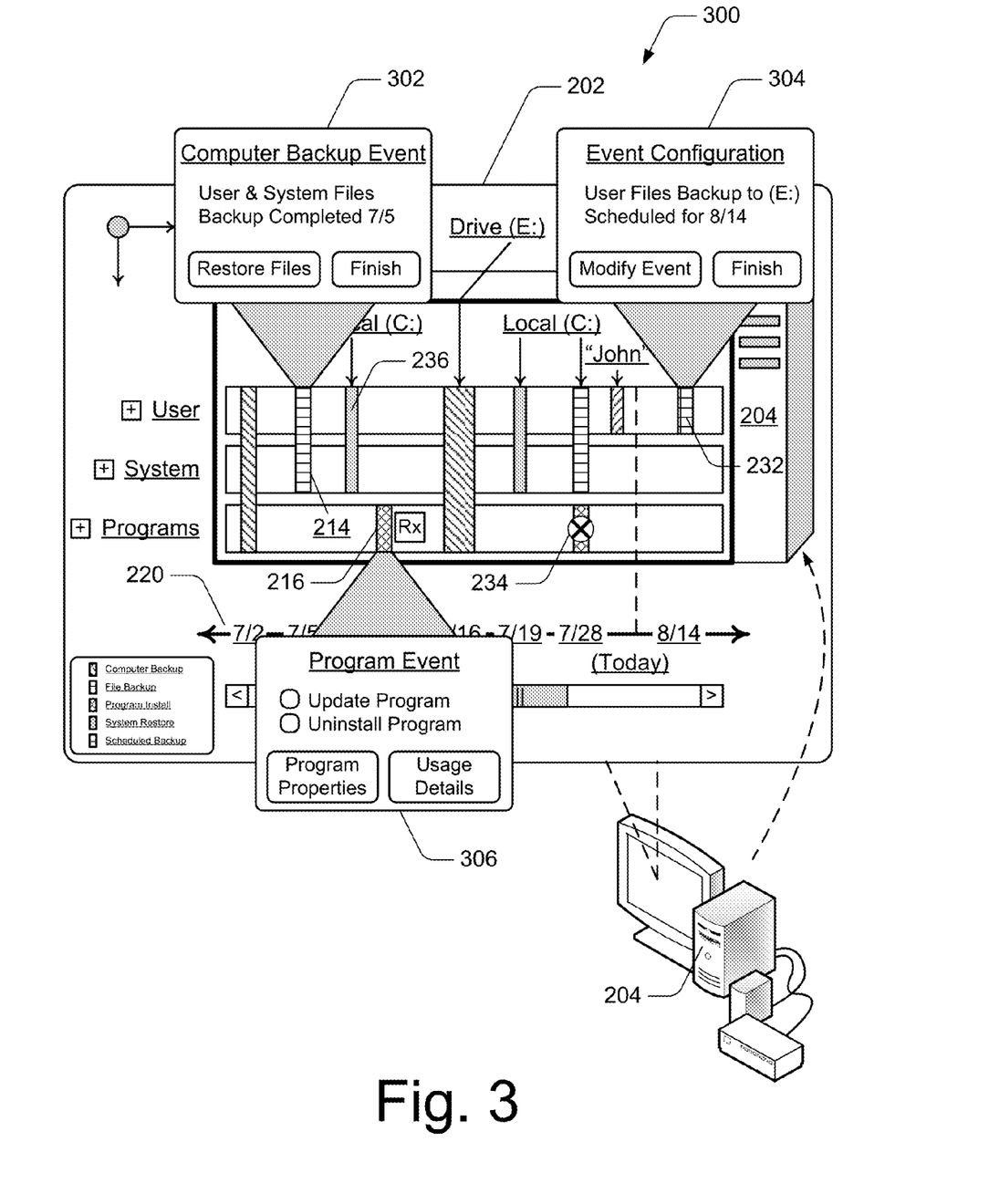
FIG. 3 further illustrates embodiment(s) of the computer system events interface shown in FIG. 2.

FIG. 3 further illustrates one or more embodiments 300 of the computer system events interface 202 shown in FIG. 2. Any of the various event indicators displayed in the computer system events interface 202 are selectable to initiate an information and/or configuration display pertaining to a corresponding computer event. A user can select an event indicator with a computer mouse (e.g., a "double-click), or with any other type of pointing and/or selection device. For example, event indicator 214 indicates a past computer event and is selectable by a user to initiate information display 302 which includes information pertaining to the computer backup event. In addition to the information detailing the computer backup, a user can select to restore files from the information display 302. Similarly, event indicator 236 indicates a system restore point for computer device 204 and a user may select the event indicator to perform a system restore.

In another example, event indicator 232 indicates a future computer event and is selectable by a user to initiate configuration interface 304 from which the future computer event can be controlled, rescheduled, and/or modified. An example of a modification to a future computer event includes clicking on a computer drive destination (e.g., "Drive (E:)", "Local (C:)", etc.) to change the destination of a scheduled file and/or system backup. A future computer event can also be modified by clicking on a date and/or time field to reschedule or update a planned backup. The future computer event can also be selected and dragged to reposition it in the event sequence 220 to reschedule or update the planned backup.

Alternatively, a user may select or click on a future event indicator to initiate a settings "wizard" which assists the user through a sequence of configuration settings for a computer event. In an embodiment, an event indicator may indicate a group of scheduled computer events combined as one event, such as an event labeled "computer maintenance". A user can combine computer events as a group which may include a system backup, a drive defragment, a scan for malware, and a computer event to create a system restore point.

In another example, the program update indicated by event indicator 216 is selectable by a user to initiate an information and/or configuration interface 306 from which the corresponding program can be modified, updated, uninstalled, and/or other program actions initiated. In addition, the information and/or configuration interface 306 can include program properties and information such as program installation details, various updates, and usage details. In another embodiment, a program event indicator, such as the event indicator 216, can be selected, dragged, and dropped onto a "Recycle Bin" icon or other similar trash or garbage indicator to uninstall the program associated with the event indicator.

In another embodiment of a computer system events interface 202, a user may select an event indicator that initiates a search for information and/or a connection to an Internet repository or other information exchange. For example, event indicator 234 includes the indication that a program update was not successful. The event indicator 234 is selectable to initiate an Internet search for information pertaining to the failure of the program update.

Figure 4:
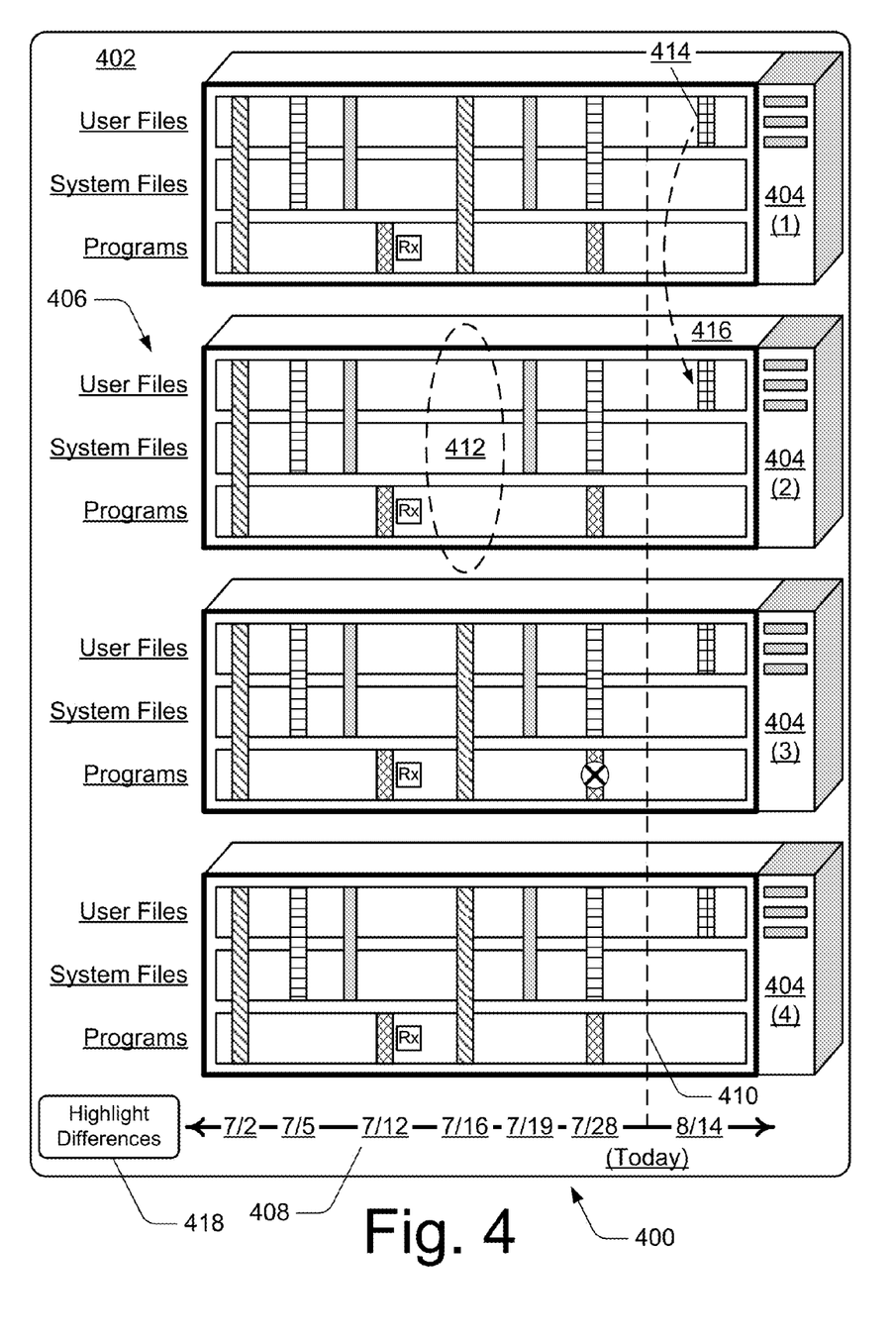
FIG. 4 illustrates embodiment(s) of a computer system events interface for computer events corresponding to multiple computer devices.

FIG. 4 illustrates one or more embodiments 400 of a computer system events interface 402 for computer events corresponding to multiple computer devices of a computer system. An example computer system shown in FIG. 1 includes a computer system events interface implemented to display computer events corresponding to multiple computer and/or server devices. Similarly, the computer system events interface 402 displays computer events corresponding to multiple computer devices 404(1-4) (although any number of computer devices may be included).

The computer system events interface 402 includes a representation of each computer device 404(1-4). Each representation of a computer device 404 includes various event indicators and the categories 406 of the corresponding computer events. The computer system events interface 402 also includes an event sequence 408 to indicate a relationship between past, current, and/or future computer event(s). Past computer events are distinguished from future computer events by a "Today" line 410 (or other similar "Now" or "Current" indication) that indicates the present date and/or time across all of the computer device representations.

The representations of the multiple computer devices 404(1-4) provides a visual pattern for a user or system administrator to recognize discrepancies between computer events for the different computer devices. For example, it is easy to determine that computer device 404(2) did not have a computer backup at 412 on July 16 when a backup was initiated for all of the other computer devices. This provides a visual indication utilizing pattern recognition to prompt a user when managing a system of multiple computer devices.

In an embodiment, a future computer event can be defined or scheduled on the computer system events interface 402 at a computer device and then applied to any or all of the other computer devices. For example, a user can define future computer event 414 at computer device 404(1) and then apply the defined computer event at 416 to any one or more of the other computer devices 404(2-4).

The computer system events interface 402 also includes a "Highlight Differences" selectable control 418. When selected, differences between computer events on the multiple computer devices 404(1-4) are highlighted and similarities are masked to distinguish the differences. An example is illustrated in FIG. 5.

Figure 5:
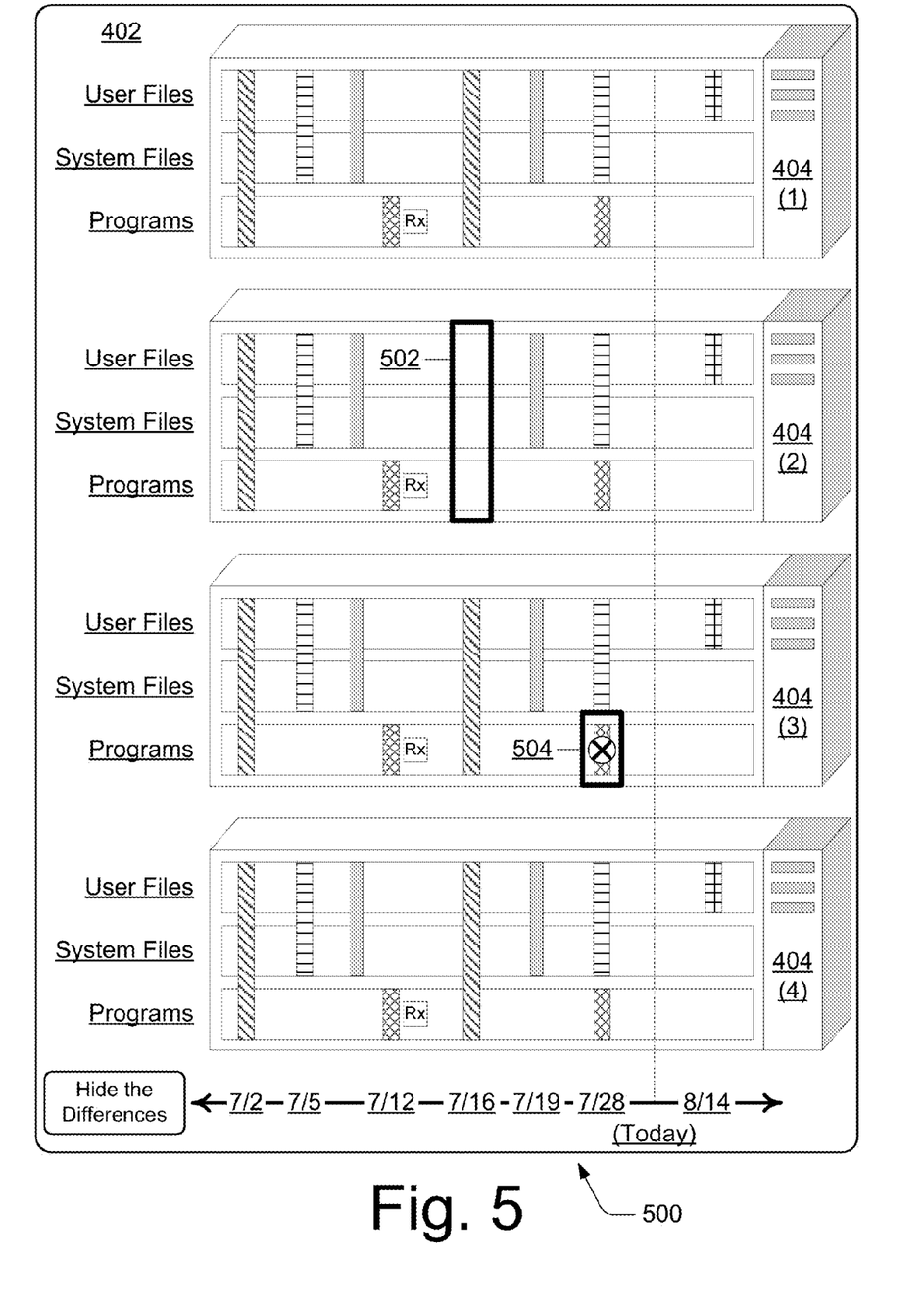
FIG. 5 further illustrates embodiment(s) of the computer system events interface shown in FIG. 4.

FIG. 5 further illustrates one or more embodiments 500 of the computer system events interface 402 shown in FIG. 4. When the "Highlight Differences" selectable control 418 shown in FIG. 4 is selected, differences between computer events on the multiple computer devices 404(1-4) are highlighted and similarities are masked to distinguish the differences. For example, identifier 502 highlights that computer device 404(2) did not have a computer backup when a backup was initiated for all of the other computer devices. Further, identifier 504 highlights that a program update failed on computer device 404(3). However, the program update was successful for all of the other computer devices and the corresponding event indicators are masked. The "Highlight Differences" feature of a computer system events interface helps a user or administrator with the challenging tasks of managing multiple computer devices.

In this example, the "masked" items are depicted as being thinner, lighter lines when compared to the computer system events interface shown in FIG. 4. Further, the masked items and the highlights 502, 504 are merely exemplary. Any other type of fading, shading, shadowing, coloring, highlights, or distinguishing visual effects can be utilized to highlight, mask, or otherwise display any of the computer system events interfaces shown in the figures and described herein.

Figure 6:
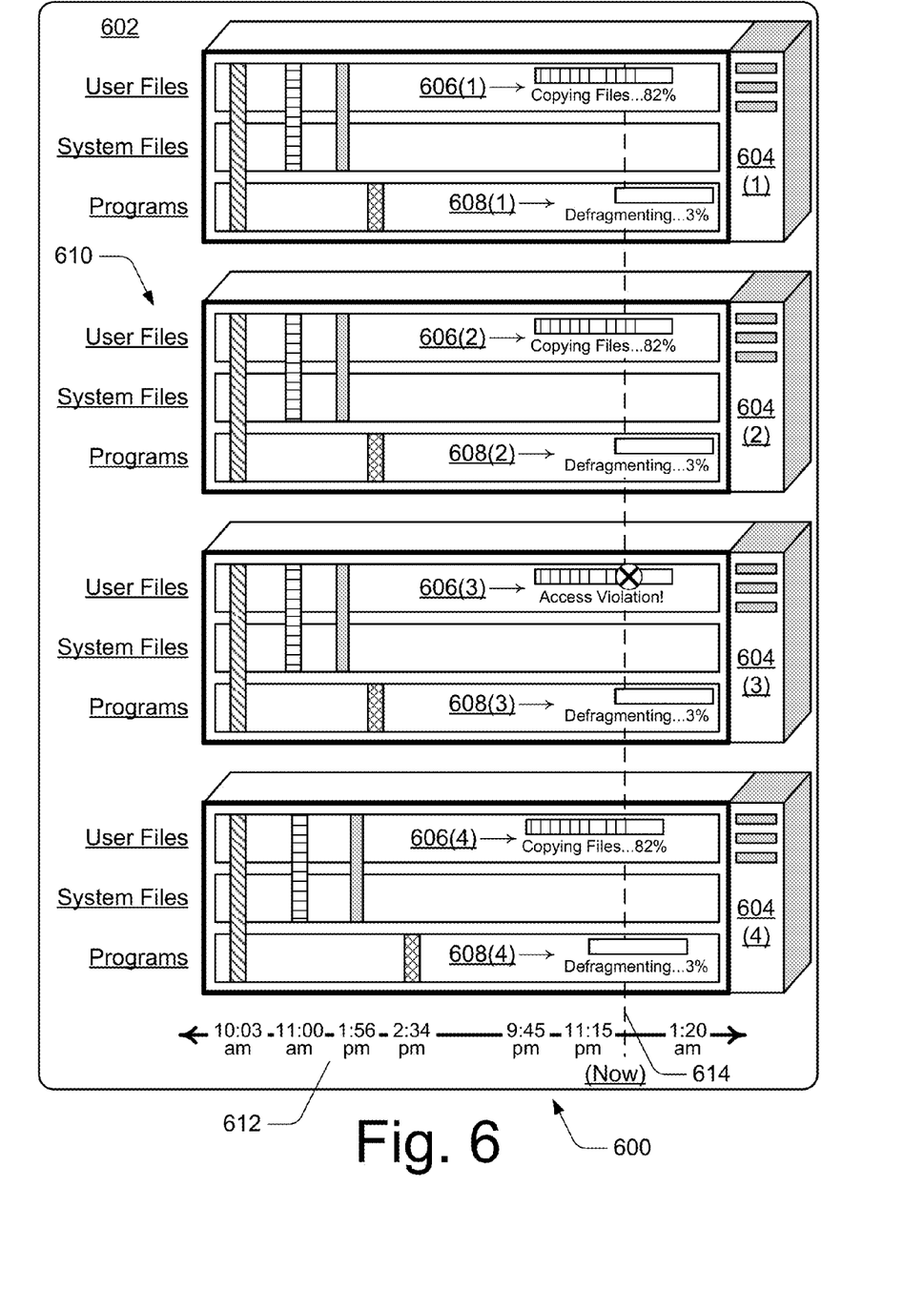
FIG. 6 illustrates embodiment(s) of a computer system events interface for computer events corresponding to multiple computer devices.

FIG. 6 illustrates one or more embodiments 600 of a computer system events interface 602 for computer events corresponding to multiple computer devices of a computer system. An example computer system shown in FIG. 1 includes a computer system events interface implemented to display computer events corresponding to multiple computer and/or server devices. Similarly, the computer system events interface 602 displays computer events corresponding to multiple computer devices 604(1-4) (although any number of computer devices may be included).

The computer system events interface 602 includes a representation of each computer device 604(1-4). Each representation of a computer device 604 includes various event indicators 606(1-4) and 608(1-4), and includes the categories 610 of the corresponding computer events. The computer system events interface 602 also includes an event sequence 612 to indicate a relationship between past, current, and future computer event(s). Past computer events are distinguished from future computer events by a "Now" line 614 (or other similar "Current" indication) that indicates the present time and/or date across all of the computer device representations.

In an embodiment, the event indicators 606(1-4) and 608(1-4) can each indicate a current computer event that is a long-running or extended task at a respective computer device 604(1-4). For example, computer events such as defragmenting a drive or copying large files may run as processes that encompass several minutes and/or hours as indicated by the event sequence 612. Some computer events may also include processes that encompass more than one day. Further, a long-running or extended current task may be indicated as having been partially completed in the "past" and continuing into the "future", such as event indicators 606(1-4) which cross the "Now" line 614. The computer system events interface 602 can be utilized by a user or administrator as a single viewing source to monitor and manage the progress of several simultaneously running processes, rather than having to monitor multiple, independent progress dialogs for each process.

Figure 7:
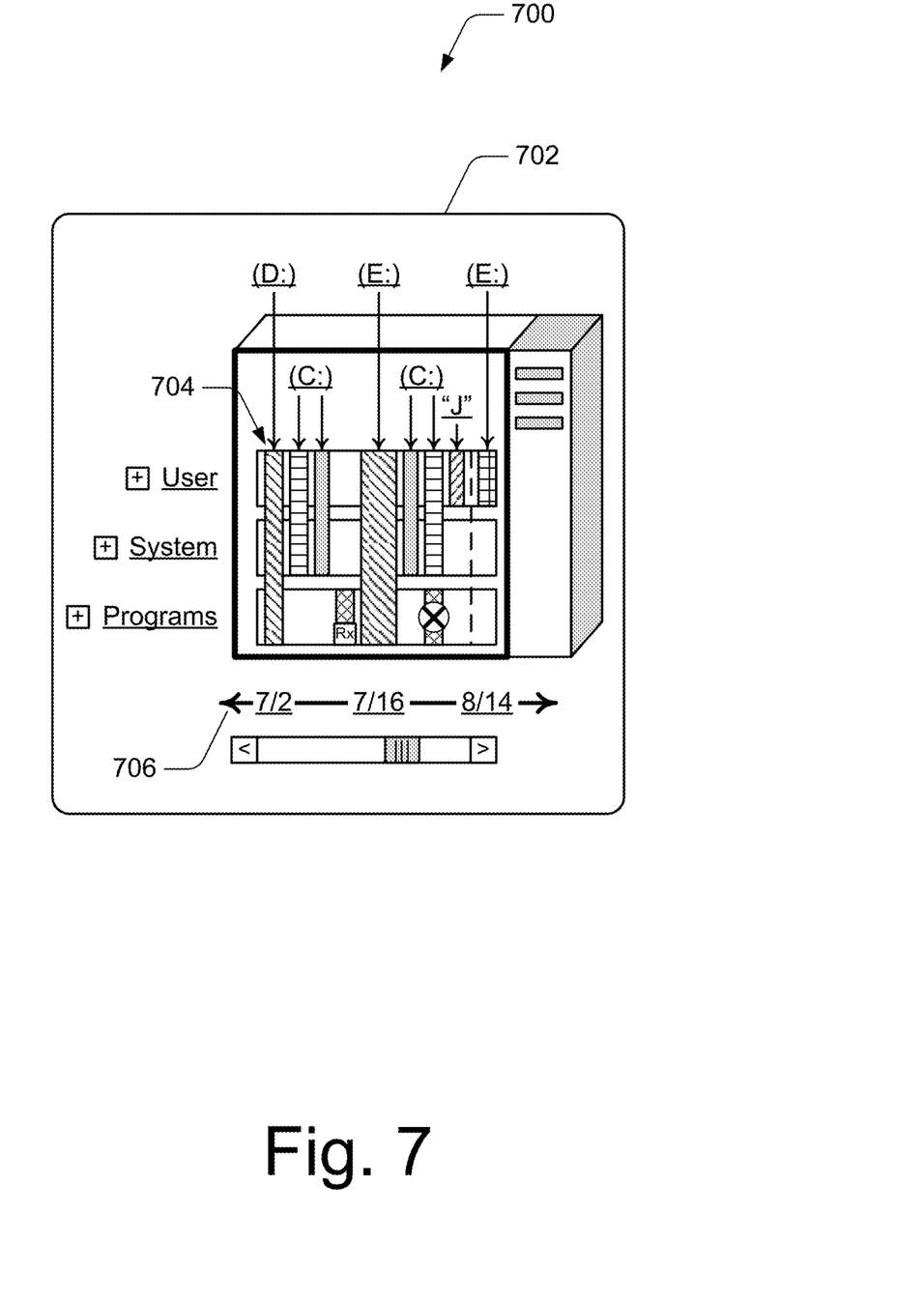
FIG. 7 illustrates embodiment(s) of a computer system events interface.

FIG. 7 illustrates one or more embodiments 700 of a computer system events interface 702 for computer events corresponding to one or more computer devices. The computer system events interface 702 is a "time warp" display of the computer system events interface shown in FIG. 2. The event indicators 704 corresponding to the computer events are displayed without the relative time blank spaces and/or relative date blank spaces between them. The event sequence 706 is time-warped such that the event indicators 704 are displayed without an indication of a time duration between the computer events. The "time warp" representation of the computer system events interface 702 is compact and can be utilized for an efficient use of display space.

Generally, any of the functions, methods, and modules described herein can be implemented using hardware, software, firmware (e.g., fixed logic circuitry), manual processing, or any combination thereof. A software implementation of a function, method, or module represents program code that performs specified tasks when executed on a computer processor. Example method 800 described with reference to FIG. 8 may be described in the general context of computer-executable instructions. Generally, computer-executable instructions can include applications, routines, programs, objects, components, data structures, procedures, modules, functions, and the like that perform particular functions or implement particular abstract data types. The method may also be practiced in a distributed computing environment where functions are performed by remote processing devices that are linked through a communications network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 8:
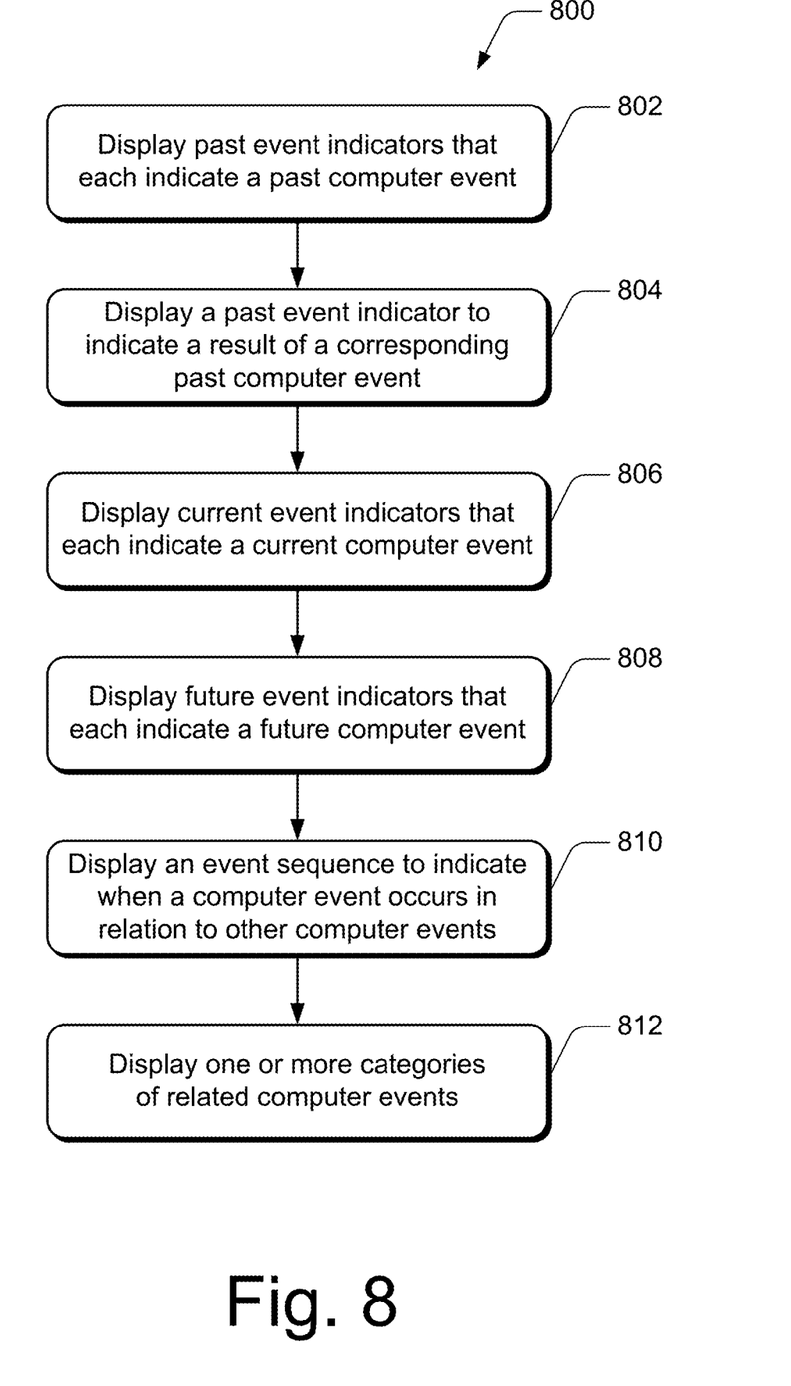
FIG. 8 illustrates example method(s) for a computer system events interface in accordance with one or more embodiments.

FIG. 8 illustrates example method(s) 800 of a computer system events interface. The order in which the method is described is not intended to be construed as a limitation, and any number of the described method blocks can be combined in any order to implement the method, or an alternate method.

At block 802, past event indicators are displayed that each indicate a past computer event. For example, computer system events interface 202 (FIG. 2) includes past event indicators (e.g., event indicators 208, 214, 216, 230, 234, 236, 238, 240) that each indicate a past computer event corresponding to computer device 204. In another example, computer system events interface 402 (FIG. 4) includes past event indicators that each indicate a past computer event corresponding to multiple computer devices 404(1-4).

At block 804, a past event indicator is displayed to indicate a result of a corresponding past computer event. For example, computer system events interface 202 includes past event indicator 234 that indicates a program update was not successful. Further, the width of event indicator 230 indicates that a computer backup included considerably more computer data than a previous computer backup, as indicated by the smaller event indicator 208. The event indicators can provide a visual indication corresponding to a functional aspect of a computer event.

At block 806, current event indicators are displayed that each indicate a current computer event. For example, computer system events interface 602 includes current event indicators 606(1-4) that each indicate a process running on respective computer devices 604(1-2). A current computer event can be indicated as having been partially completed in the "past" and continuing into the "future", such as event indicators 606(1-4) which cross the "Now" line 614 of the event sequence 612.

At block 808, future event indicators are displayed that each indicate a future computer event. For example, computer system events interface 202 includes a future event indicator 232 that indicates a future computer event corresponding to computer device 204. In another example, computer system events interface 402 includes future event indicators that each indicate a future computer event corresponding to multiple computer devices 404(1-4).

At block 810, an event sequence is displayed to indicate when a computer event occurs in relation to other computer events. For example, computer system events interface 202 includes event sequence 220 to indicate when the past computer events occurred in relation to each other, and to indicate when the future computer event will occur in relation to additional future computer events. An event sequence can indicate any type of date, time, and/or other relationship between past, current, and/or future computer event(s).

At block 812, one or more categories of related computer events are displayed. For example, computer system events interface 202 includes categories 206. In an embodiment, one of the categories is displayed as a "User" category to indicate user-initiated and/or user-file computer events. Another category is displayed as a "System" category to indicate system-initiated and/or system-file computer events. Another category is displayed as a "Programs" category to indicate program-initiated computer events. The "User", "System", and "Programs" categories are merely example classifications and/or groupings of computer events. Any other types of labels, categories, groupings, and/or identifiers may be implemented to associate various computer events on a computer system events interface.

Figure 9:
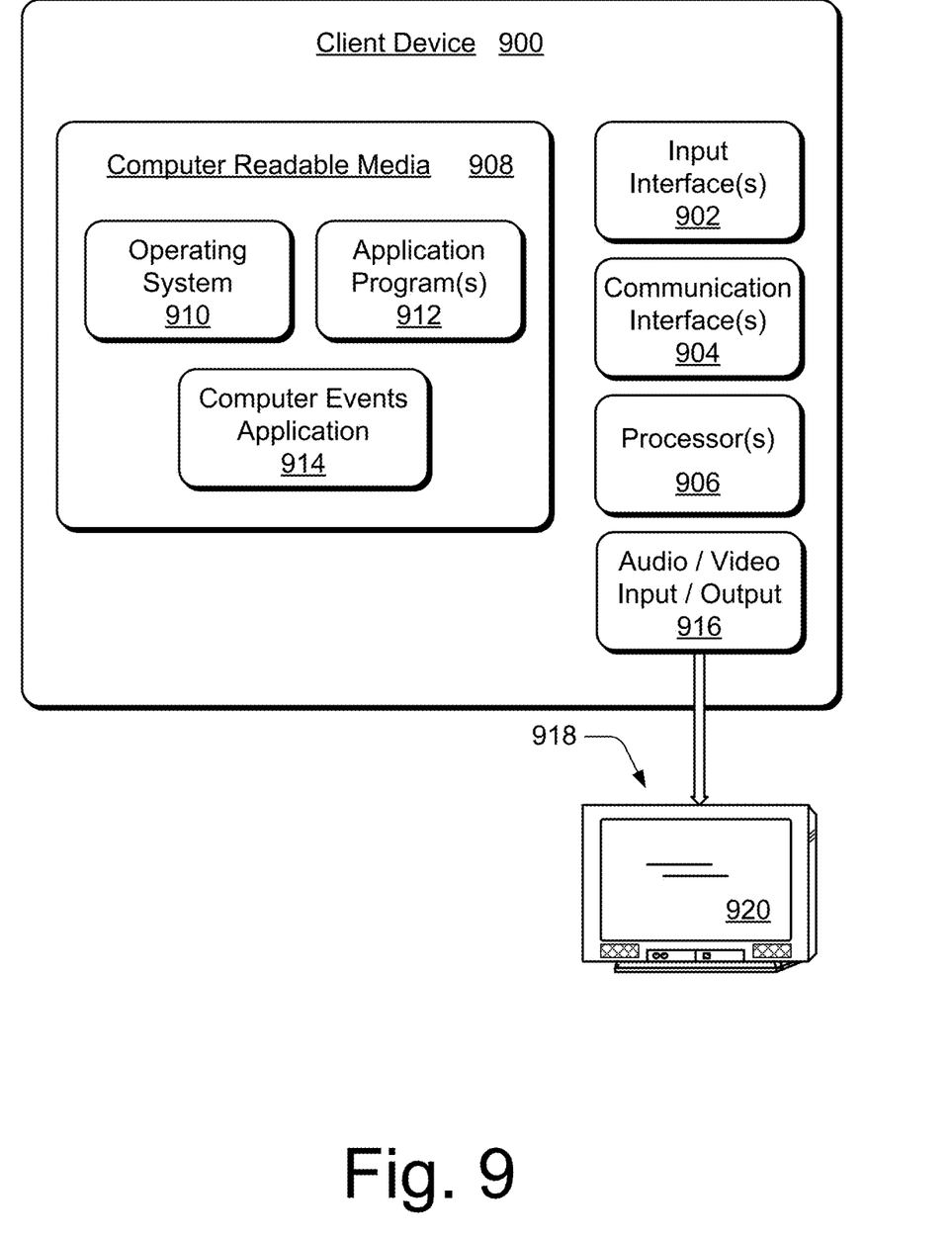
FIG. 9 illustrates various components of an example computer device which can implement embodiments of a computer system events interface.

FIG. 9 illustrates various components of an example computer device 900 that can be implemented as any form of a computer or computing-based device to implement embodiments of a computer system events interface. For example, the computer device 900 can be implemented as any of computer devices 106, 122, 124, 126 shown in FIG. 1; as computer device 204 shown in FIG. 2; as any of the computer devices 404(1-4) described with reference to FIG. 4; or as any of the computer devices 604(1-4) described with reference to FIG. 6.

Computer device 900 includes one or more input interface(s) 902 by which any type of data inputs can be received. Computer 900 further includes communication interface(s) 904 which can be implemented as any one or more of a serial and/or parallel interface, a wireless interface, any type of network interface, a modem, and as any other type of communication interface for external communication, such as with networked devices and systems.

Computer device 900 also includes one or more processor(s) 906 (e.g., any of microprocessors, controllers, groups thereof, and the like). The processors 906 process various computer-executable instructions to control the operation of computer 900, to communicate with other electronic and computing devices, and to implement embodiments of a computer system events interface.

Computer device 900 can be implemented with computer-readable media 908, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer-readable media 908 provides data storage mechanisms to store various information and/or data such as software applications and any other types of information and data related to operational aspects of computer device 900. For example, an operating system 910 and/or other application programs 912 can be maintained as software applications with the computer-readable media 908 and executed on processor(s) 906 to implement embodiments of a computer system events interface.

As an application program, computer events application 914 can be maintained with the computer-readable media 908 and executed on processor(s) 906 to implement embodiments of a computer system events interface. In various embodiments, the computer events application 914 monitors, receives, requests, receives, registers, and/or otherwise obtains the information and data from within any one or several computer devices to display the event indicators for computer events on a computer system events interface. Although the computer events application 914 is illustrated and described as a single application, the computer events application 914 can be implemented as several component applications or modules distributed to perform one or more functions of a computer system events interface.

Computer device 900 also includes an audio and/or video output 916 to provide audio and video data to an audio rendering and/or display system 918. The audio rendering and/or display system can include any devices that process, display, and/or otherwise render audio, video, and image data. Video signals and audio signals can be communicated from device 900 to a display device 920 via an RF (radio frequency) link, S-video link, composite video link, component video link, DVI (digital video interface) link, analog audio connection, or other similar communication link. Alternatively, the audio rendering and/or display system 918 are integrated components of the computer device 900.

Although shown separately, some of the components of computer 900 can be implemented in an application specific integrated circuit (ASIC). Additionally, a system bus (not shown) typically connects the various components within computer 900. A system bus can be implemented as one or more of any of several types of bus structures, including a memory bus or memory controller, a peripheral bus, an accelerated graphics port, or a local bus using any of a variety of bus architectures.

Although embodiments of a computer system events interface have been described in language specific to features and/or methods, it is to be understood that the subject of the appended claims is not necessarily limited to the specific features or methods described. Rather, the specific features and methods are disclosed as example implementations of a computer system events interface.

The invention claimed is:

1. A computer device, comprising:
  at least a memory and a processor to implement an events application that is configured to generate an events interface that includes:
  event sequences configured to indicate software application events that occur in relation to each other along an adjustable continuum, each of the event sequences corresponding to a software application that is executable on one or more computer devices;
  one or more past event indicators along the event sequences that each present as a past software application event that occurred on at least one of the computer devices; and
  the events interface configured to indicate when a software application event on one of the computer devices is different than the software application event on at least one other of the computer devices.

2. The computer device as recited in claim 1, wherein the software application implemented by two or more of the computer devices, and wherein modules of the software application are each executable on the two or more computer devices.

3. The computer device as recited in claim 1, wherein the event sequences include relative spacing between the one or more past event indicators, the relative spacing between two of the past event indicators being an indication of a time duration between the software application events that correspond to the two past event indicators.

4. The computer device as recited in claim 1, wherein the event sequences are time-warped to present a sequence order of the software application events without relative spacing between the software application events.

5. The computer device as recited in claim 1, wherein the events interface includes future event indicators along the event sequences that each present as a future software application event scheduled to occur on at least one of the computer devices.

6. The computer device as recited in claim 1, wherein the one or more past event indicators are each a visual indication corresponding to a functional aspect of a software application event.

7. The computer device as recited in claim 1, wherein the event sequences include a user-defined event indicator configured to indicate a user event associated with the software application executing on one or more of the computer devices.

8. The computer device as recited in claim 1, wherein the events interface further includes a selectable control configured for user-selection to initiate a display change of the events interface.

9. The computer device as recited in claim 1, wherein the events interface further includes a selectable control configured for user-selection to filter the one or more past event indicators to present a particular type of the software application events.

10. A computer-implemented method, comprising:
  monitoring software application events that occur on one or more computer devices;
  generating an events interface to present event indicators of the software application events along event sequences that each indicate the software application events that occur in relation to each other along an adjustable continuum, each of the event sequences corresponding to a software application executing on the one or more computer devices;
  presenting one or more past event indicators along the event sequences, the one or more past event indicators each indicating a past software application event that occurred on at least one of the computer devices; and
  indicating, in the events interface, when a software application event on one of the computer devices is different than the software application event on at least one other of the computer devices.

11. The computer-implemented method as recited in claim 10, wherein the software application implemented by two or more of the computer devices, and wherein modules of the software application are each executable on the two or more computer devices.

12. The computer-implemented method as recited in claim 10, further comprising displaying an event information display on the events interface, the event information display pertaining to a past software application event when receiving a user-selectable input of a corresponding past event indicator.

13. The computer-implemented method as recited in claim 10, wherein the event sequences include relative spacing between the one or more past event indicators, the relative spacing between two of the past event indicators being an indication of a time duration between the software application events that correspond to the two past event indicators.

14. The computer-implemented method as recited in claim 10, further comprising presenting one or more future event indicators along the event sequences, the one or more future event indicators each indicating a future software application event scheduled to occur on at least one of the computer devices.

15. The computer-implemented method as recited in claim 10, further comprising presenting the one or more past event indicators that each indicate a result of a corresponding past software application event.

16. A computer system, comprising:
  computer devices configured to implement a software application that is executable on two or more of the computer devices;
  an events interface configured to display event indicators of software application events that occur on each of the computer devices, the software application events including past software application events corresponding to modules of the software application executing on each of the computer devices;

the events interface including event sequences configured to indicate when the software application events occur in relation to each other along an adjustable continuum, and the events interface including one or more past event indicators along the event sequences that each present as a past software application event having occurred on at least one of the computer devices; and the events interface configured to indicate when a software application event on one of the computer devices is different than the software application event on at least one other of the computer devices.

17. The computer system as recited in claim 16, further comprising an events application configured to execute on at least one of the computer devices and generate the events interface to display the software application events.

18. The computer system as recited in claim 16, wherein the events interface includes event progress indicators to indicate a progress of at least one current software application event running as a process on one or more of the computer devices.

19. The computer system as recited in claim 16, wherein a past event indicator of a past software application event is user-selectable to initiate an information display about the past software application event.

20. The computer system as recited in claim 16, wherein the event sequences include relative spacing between the one or more past event indicators, the relative spacing between two of the past event indicators being an indication of a time duration between the software application events that correspond to the two past event indicators.

* * * * *